United States Patent [19]
Noble, III

[11] Patent Number: 5,746,259
[45] Date of Patent: May 5, 1998

[54] INJECTION SYSTEM FOR SERVICING FLUIDS INTO OR THROUGH AN ENCLOSED REGION

[76] Inventor: John O. Noble, III, 4803 Ramus, Houston, Tex. 77092

[21] Appl. No.: 758,236

[22] Filed: Nov. 27, 1996

[51] Int. Cl.⁶ .................................................... B65B 3/04
[52] U.S. Cl. ............................... 141/92; 141/5; 141/7; 141/67; 141/98; 141/231; 141/382; 134/169 A; 165/95; 184/1.5
[58] Field of Search ........................ 141/5, 7, 91, 92, 141/67, 98, 231, 382; 134/169 A; 165/95; 184/1.5

[56] References Cited

U.S. PATENT DOCUMENTS

| | | |
|---|---|---|
| 1,307,173 | 6/1919 | Anthony . |
| 3,810,487 | 5/1974 | Cable et al. ............................ 184/1.5 |
| 3,976,110 | 8/1976 | White ................................... 141/382 |
| 4,195,672 | 4/1980 | Freeman ............................... 141/91 |
| 4,390,049 | 6/1983 | Albertson ............................. 141/92 |
| 4,597,416 | 7/1986 | Scales ............................... 134/169 A |
| 4,880,144 | 11/1989 | Shea ................................... 184/1.5 |
| 5,060,703 | 10/1991 | Koerner ............................... 141/98 |
| 5,070,917 | 12/1991 | Ferris et al. ......................... 141/38 |
| 5,176,187 | 1/1993 | Grant .................................. 141/7 |
| 5,403,417 | 4/1995 | Dudley et al. ........................ 156/97 |
| 5,441,101 | 8/1995 | Johnsson ............................. 165/95 |
| 5,524,681 | 6/1996 | Davies et al. ....................... 141/92 |

OTHER PUBLICATIONS

Reclaim Refrigerant with New Draf 1400 Brochure, Braf Industries Inc., Bedford Hills, N.Y., 2 Pages.
Robinair (Mobile Edition) (1995), p. 17.

*Primary Examiner*—J. Casimer Jacyna
*Attorney, Agent, or Firm*—Gunn & Associates, P.C.

[57] ABSTRACT

This invention is directed toward apparatus and methods for servicing equipment such as air conditioning systems, refrigeration systems, engines, transmissions, and tires More particularly, invention is directed toward a system for safely transferring precisely measured quantities of a variety of liquids and gases to the serviced item using essentially a single work station apparatus cooperating with multiple reservoirs of fluids. Furthermore, one or more types of fluids can be supplied, from remote reservoirs, to one or more mobile work stations. Fluids can also be withdrawn from the apparatus being serviced, and reprocessed for future use. Stated another way, the invention eliminates the need for dedicated service equipment to provide each applicable service. This invention is suitable for many market segments such as commercial, industrial, marine, utility, and the like. Government, military, public and private sectors of the economy will benefit from the use of this invention.

47 Claims, 4 Drawing Sheets

INJECTION SYSTEM FOR SERVICING FLUIDS INTO OR THROUGH AN ENCLOSED REGION

BACKGROUND OF THE INVENTION

1. Field of the Invention

This invention is directed toward apparatus and methods for servicing equipment such as air conditioning systems, refrigeration systems, engines, transmissions, and tires. More particularly, invention is directed toward a system for safely transferring precisely measured quantities of a variety of liquids and gases to the serviced item using essentially a single work station apparatus. This invention is suitable for many market segments such as commercial, industrial, marine, utility, and the like. Government, military, public and private sectors of the economy will benefit from the use of this invention.

2. Background of the Art

The service industry is one of the largest industries in the United States, and likewise is one of the largest and fastest growing industries in the world. This area spans a tremendously wide range of sectors, with two of the largest sector being the automobile service industry and the air conditioning service industry.

Attention is first drawn to the automobile service industry, which more precisely should be referred to as vehicle service industry, since this sector generally includes servicing of other types of vehicles such as buses, light trucks, heavy trucks and the like. It goes without saying that the number of vehicles is growing faster than the general population. These vehicles, and peripheral system used by these vehicles, require repair and routine preventive maintenance. Service generates a significant portion of the total revenue generated by the automobile industry. A recent study conducted in the United States found that in 1995, vehicle service generated 45 percent of the revenue of automobile dealers, while only 8 percent of the revenue was generated by the sale of new vehicles. The remainder of the dealership revenue was generated by the sale of used cars, and the leasing of new cars. With this brief overview of the vehicle service industry, it is apparent that the efficiency of service apparatus and methods used in servicing any and all types of vehicles have a tremendous financial impact on the service industry sector. This service sector involves lubricants and solvents which are environmentally hazardous, and therefore the handling of these materials is highly regulated. Apparatus which improves environmental safety without compromising efficiency also significantly impacts the finances of the vehicle service industry.

Attention is next directed toward the air conditioning and refrigeration industry. Refrigeration is used in all areas of the United States, and in most areas of the world, as a primary means for preserving the food supply. During the last half of the twentieth century, the population distribution of the United States has tended to move south toward warmer regions which are commonly referred to as the "sun belt" states. Although winters are relatively mild, summers are relatively hot. The hot summers in the sun belt, and the shifting population to this region, have resulted in a tremendous increase in the use of air conditioning equipment. Essentially all large shopping malls, and the majority of homes, are air conditioned. Furthermore, essentially all passenger vehicles in use in the sun belt states, and in use in all but the most temperate climate regions, are air conditioned. Refrigeration and air conditioning units require scheduled and unscheduled service, and like the automobile industry, the service sector is a major generator of revenue. Refrigerants and oils used in the refrigeration and air conditioning equipment are also controlled as potentially environmentally hazardous materials. As in the case of the automobile service industry, any apparatus and methodology which increases the efficiency of servicing cooling equipment, and the handling of materials used in the servicing and operation of this type of equipment, significantly affects the finances of the industry.

Initially, the servicing of vehicle engines or other components, air conditioning units, and other such equipment involving the transfer of fluid, was performed with dedicated equipment. As an example, oil was added to an engine by literally pouring it from a can into the engine, or transferring it from a drum by means of a dedicated pump and service flow line. Using the latter, bulk method, the metering of the correct amount of oil required presented a problem. Adding (and removing) other fluids such as transmission fluid, differential oil and the like, was done serially with dedicated reservoirs and flow lines, with dubiously accurate metering devices. As a further example, air and possibly sealants were added to pneumatic tires using dedicated sources of compressed air and sealant, respectively, and often delivered with dedicated service hoses and fittings.

Traditional servicing of air conditioning units has also required dedicated systems. Refrigerant and oil is typically removed with one system. The system is leak tested with another dedicated system. The system is evacuated with a dedicated vacuum pump and associated service lines or hoses. Refrigerant and oil are added with still additional dedicated systems. It is very important to note that leak testing with nitrogen as a pressurization medium is not new to the petrochemical industry. For many years, the industry has used the method for testing its pressure vessels, such as heat exchangers, piping and the like. However, the method is new in its application to the mobile and stationary air conditioning and refrigeration industries, though only occasionally used by some enlightened technicians as stand-alone equipment to flush and leak test. Furthermore, because there is no widespread understanding of its value within those markets, service equipment is not currently available to accommodate the use of a compressed gas into the now popular "recovery" machine, or dual function "recovery-recycle" machine, as an embodiment of their operation. None has integrated the concept of the invention to be disclosed into their designs.

The importance of integrating compressed gas into air conditioning and refrigeration service equipment is now addressed. Although modern recovery and recycling equipment includes a degree of similarity to the present invention, none has incorporated compressed gas leak test capabilities. This feature is important because, as refrigerant compressor oil circulates throughout an air condition or refrigeration system, it coats the inside of all hoses, tubes, fittings and system components. The oil coating becomes a seal against leaks, making small leaks difficult to detect.

A recent automobile air conditioning trade association survey reported that the national average of success in finding air conditioning system leaks the first time, with today's technology, is only 75%. This means that 25% of all leaks on automobile air conditioning systems are not being found the first time, which translates into many repair jobs which must be reworked and thereby costing extra manpower, lost revenue and customer dissatisfaction.

Examples of modern leak detectors include ultraviolet fluorescent dyes, electronic leak detectors (corona discharge and heated diode technology), and the like.

The failure of non-compressed gas leak testing methodology has occurred because it focuses entirely on the "sensing" or "visual observation" of leaks at ambient pressures. But, the hard-to-find leaks like to "hide" underneath oil and sludge which coats the inside of the system components. Therefore, when technicians use their modern leak detectors, they are failing to locate 25% of the leaks because they have no way to duplicate the conditions in which leaks will fester through the oil and sludge coating. Leaks tend to temporarily seal off when the system is turned off. Thus, even the best leak sensing devices are rendered useless. Probably the biggest single reason why technicians are not finding leaks 25% of the time is that they focus on the "sensing" of leaks before they fester and they fail to understand the importance of first "displacing" system oil and sludge. Locating slow leaks is a "process", not a one-shot test. Therefore, if the coating of refrigerant oil/sludge is not removed from the inside of components of the air conditioning system, a leak detector will not sense some leaks because they are not active during testing. The conditions conducive to leak occurrence have not been reproduced as a prerequisite for the test, namely to create "static" conditions which most closely duplicate the "dynamic" conditions of an operating system. Basically, this invention provides a method for the injection of the three main ingredients which are essential to duplicating those operating conditions:

(1) Trace elements for the leak detector to sense.

(2) Oil/sludge displacement elements.

(3) Nitrogen or some other acceptable compressed gas which acts upon the trace elements to force them through the oil/sludge barrier and in an amount that is easier to detect because of greater than ambient pressures.

The injection of compressed gas into a system must be performed under static conditions where the compressor is not operating and the system is turned off. This must be specifically stated even though it is widely understood that no type of leak test should be performed while the system is operating. The only known exception to this practice is the use of dye as a leak detection method, where dye is injected into the system, the system is operated, and then shut off to visually observe where dye has penetrated or leached through leaks in the system. The present invention, as will be disclosed, is directed toward setting up conditions to activate dormant leaks so that a service person can use prior art leak detection devices to sense and locate the leaks.

Many other service functions currently use dedicated equipment. As a further example of such dedicated equipment and the inventive effort expended upon such dedicated equipment, three references directed toward filling a pneumatic tire with sealant will be cited. U.S. Pat. No. 1,307,173 to Anthony teaches the connection of one end of a rubber hose to a pneumatic tire and the other end of the hose to a container containing a sealant, wherein the hose as a means of injecting sealant from the container into the tire. Anthony does not disclose any means for inserting a known or metered amount of sealant, does not discloses any means for inserting metered quantities of a plurality of materials using a single apparatus, and discloses no closed loop system for transferring and recovering materials. U.S. Pat. No. 5,070,917 to Ferris et al discloses apparatus and methods for charging a pneumatic tire with a gas containing a sealant, and also states that the invention can be used in an alternate embodiment to charge a system with refrigerant. Ferris discloses no recovery system for the refrigerant, and discloses no accurate metering technique. U.S. Pat. No. 5,403,417 to Dudley et al discloses the charging of a tire and sealant material with $CO_2$, wherein the charge is supplied by an aerosol or by a pump operated from power obtained from the cigarette lighter of the vehicle. No recovery system, no accurate metering system, and no multipurpose fluid handling system for other materials such as lubricants, is taught by Dudley et al.

The foregoing discussion and examples illustrate that traditional servicing of vehicles and refrigeration equipment is performed using equipment dedicated to each specific service task. Purchase and maintenance of numerous sets of service equipment dedicated to a specific service task, and operational inefficiencies introduced by using numerous sets of service equipment, contributed significantly to the costs of the services performed. Attempts have been made in the prior art to combine, at least to some extent, service equipment in order to reduce equipment cost and to increase service efficiency. An example is the numerous small commercial establishment for "quick lube" servicing of vehicles such as changing engine oil, adding transmission fluid, lubricant to grease fittings, and adding brake, differential and cooling fluids. Some liquids such as engine oil and grease are dispensed from remote bulk storage through dedicated service lines. Other fluids, such as brake fluid, are typically dispensed from small containers by hand. The metering of the bulk liquids, such as engine oil, is at best crude. The system for dispensing specified quantities of engine oil may result in an actually delivered quantity which varies by perhaps ±10% from the specified quantity. Equipment for automated handling of bulk, gaseous fluids are not available in these establishments.

The accurate dispensing of specified amounts of lubricant, brake fluid, hydraulic fluid, coolant, sealant, coating or other material into an enclosure such as an engine crank case, transmission case, pneumatic tire, or other appropriate receiving enclosure is a serious problem. The amount of added material is typically confirmed by visual inspection by a service person. In the case of adding engine oil, the service person typically uses a dip stick to measure the "level" of the engine oil. In the case of adding brake fluid to a master brake cylinder reservoir, the service person must peer into the recess of the enclosure to verify roughly the desirability of the brake fluid level.

Depending upon the situation and the service being performed, prior art service techniques currently used can be inconvenient. As an example, the interior of the enclosure or recess of the serviced component is usually dark, making visual determination or confirmation of the service step very difficult for the service person. As a more specific example, the power steering reservoirs of most vehicle engines so equipped are notoriously inconvenient to access, and the dip stick is notoriously inaccurate thereby necessitating visual inspection of the reservoir to confirm fluid level. It must be stated that manufacturers have designed reservoirs with service ports having filler caps which must be removed and visually inspected if the reservoir is partially filled, since the amount of liquid to be added is unknown. The present invention is not directed toward preventing individuals from servicing personal equipment, but is directed toward providing means for the service professionals to be more efficient and safer in the way they service fluids. It is also hoped that the present invention will provide incentive to equipment manufacturers to accommodate the use of the disclosed apparatus and methods by improving the serviceability of their equipment.

Prior art service techniques are also inconclusive in that they often result in over filling or under filling of added liquid drawn from uncalibrated containers or reservoirs. An example of this problem is the filling of an automatic transmission unit with hydraulic fluid drawn from an uncalibrated bulk storage container. Although the level of the fill is monitored by reading a dip stick, this indicated level is highly dependent upon the temperature of the hydraulic fluid, and the ease at which the service person can view or "read" the dip stick. Either an over fill or an underfill of 5 percent can be detrimental to the operating life of the transmission.

Prior art servicing techniques can be hazardous in several aspects. As an example, the requirement of a service person into a service port can be a hazard if the contents can spurt up into the service person's eyes. As an additional example, current filling and flushing service methods lead to spillage of liquids or gases which are considered to be harmful to humans, equipment and the environment.

Aerosol methods of injecting materials are commonly used in prior art servicing operations. These are generally hand held containers without immediate liquid and pressure refill capability. They are not designed to deliver bulk volumes, and their small dispenser orifice sizes limit the flow of products.

The prior art also employs one-shot injection devices commonly referred to as "wooshers". These are typically cylinders which must be manually refilled after each use. Operation tends to be inefficient, and they do not contain any type of self contained metering device to gauge the amount of material expelled.

In summary, prior art service techniques used in the automotive industry, air conditioning industry, and any other industry which involves the dispensing, metering, removal and disposal of liquids and gases is riddled with operational, financial and safety problems. Only a few of these problems have been outlined above. Problems seem to be more intense in larger service facilities where many service people are performing services on a variety items using a seemingly endless amount of dedicated service equipment.

An object of the present invention is to provide apparatus and methods with which precise and accurate quantities of fluid can be delivered to an enclosure within a device being serviced. An example of this application would be the delivery of a precise and accurate amount of oil to an automobile air conditioning system.

A further object of the invention is to provide apparatus and methods with which a plurality of fluids can be delivered to serviced equipment using essentially the same service apparatus. Fluids might include lubricant, refrigerant, hydraulic fluid, solvent, coolant, sealant and the like. This feature of the present invention minimizes the need for dedicated service equipment for each service task.

A still further object of the invention is to provide apparatus which is convenient for the service person to use, and which minimizes hazards to the service person by way of contact and exposure, to the equipment being serviced induced by overfills and underfills and the like, and to the environment by way of spills and unwanted vents to the atmosphere.

A further object of the invention is to provide apparatus which can be configured as an "open loop" design, wherein material such as oil is delivered to or removed from the equipment being serviced as a single operation. Such a service operation would include adding engine oil to a crank case or sealant to a pneumatic tire.

A still further object of the invention is to provide apparatus which can also be configured to operate in a "closed loop" design, wherein liquid is continuously exchanged or circulated between the service equipment and the equipment being serviced. Such a closed loop service operation would include the flushing of a radiator of an air conditioning system such as a condenser or evaporator, wherein solvent is continuously circulated through a closed loop, which includes the radiator, for a predetermined length of time.

An additional object of the invention is to provide service apparatus in the form of mobile or portable work stations mounted on service carts, wherein the work station can be easily and conveniently transported to the equipment to be serviced. This feature often, but not necessarily, includes the use of remote reservoirs or pumps, with suitable plumbing to connect the remote elements to the mobile work stations on service carts.

A still further object of the invention is to provide work stations which are adapted for use in relatively large service facilities involving numerous service persons each assigned to a specific service work station. This embodiment of the invention again involves the use of central reservoirs, pressure sources, and vacuum sources which are remote from the work stations, but to which multiple work stations are operationally connected to minimize redundancy of common elements.

There are other objects and applications of the present invention which will become apparent in the disclosure and claims which follows.

SUMMARY OF THE INVENTION

The invention apparatus consists of three basic or "base" components which can be configured and operated to provide the versatility described above in the stated invention objects. The three base components are defined as (1) the calibrated injector chamber component, (2) the reservoir component, and (3) the interaction component. The calibrated injector chamber component, or injector chamber or simply "injector" for brevity, contains a calibrated amount of fluid which is to be injected into a system being serviced. An example of such fluid would be engine oil of a specified amount to be injected into the crank case of an engine being serviced. A second example would be sealant to be injected to a pneumatic vehicle tire at a given pressure. The reservoir component is, as its name implies, a reservoir (such as engine oil or refrigerant oil) to be injected into the equipment being serviced. This reservoir can be remote from the injector component, and can further serve as a reservoir for multiple injector components as will be discussed in detail in a subsequent section of this disclosure. The third base component, defined for brevity as the interaction component, comprises components used to perform the service task at hand and also serves as an "interaction" means between the injector component and the reservoir component. More specifically, the interaction component may comprise a plurality of valves, flow conduits, pumps, compressors, cylinders of gas, or any combination of these sub components. The injector and interaction components are preferably contained within a service cart which is preferably on wheels such that it can be positioned conveniently near the equipment being serviced. The reservoir component can be remote from the service cart, or in some embodiments of the invention, also be mounted on the service cart. Functional relationship between the interaction component, and the reservoir component, will be fully disclosed in the following section.

It is also noted early in this disclosure that the invention can be operated as a "closed loop" system or as an "open loop" system. The mode of operation is determined by the service task at hand, and the arrangement of the sub components or elements of the interaction component. The distinguishing features of the close loop and open loop operation will be disclosed by means of examples.

As an illustration of the basic components of the invention operating as an open loop system, assume that the service task requires the injection of a precise amount of oil into an air conditioning system. For this task, the interaction component uses an injector refill pump and a valve arrangement comprising five valves. There are three modes of operation in performing this service task. Each operational mode will be described briefly. The modes are initiated and terminated preferably by switches which are set by the service person and which are mounted on a control panel preferably affixed to the service cart.

The first mode of operation is the filling of the injector with liquid, which is oil in this example, from the reservoir component. This is accomplished by opening two valves (by means of two switches on the control panel) such that oil is transferred to the injector by the action of the injector refill pump. As the injector is filled, gas displaced from the closed injector chamber is transferred to the liquid reservoir. This prevents any fumes which might be contained in the gas from venting into the atmosphere.

The second mode of operation is the transfer of a specified amount of oil from the injector assembly to the equipment being serviced. The valves opened during the first mode are closed, and two additional valves are opened such that compressed gas from a cylinder or compressor flows into the sealed injector chamber thereby forcing oil through a series of conduits and through a service hose to the equipment being serviced, which is an air conditioning system in the example being discussed. Again, the flow is initiated and terminated by the operation of valves, or valves controlled by switches on the control panel. The injector assembly is constructed with at least a section of transparent material for viewing the level of liquid within. This "sight glass" is also calibrated preferably with a series of inscribed marks which correspond to a given volume of fluid. By use of the calibrated sight glass, the service person can transfer the desired amount of oil into the air conditioning system. When the viewed fluid level drops to a level representative of the desired injection volume, the service person then terminates the second mode by the operation of the same valves or switches on the control panel.

As mentioned above, the second mode is terminated based upon sight glass readings made by the service person. When the desired oil level within the sight glass is reached, this does not mean that all of the oil has reached its final destination, namely the air conditioning system being serviced. A portion of the oil still resides within the conduits in the interaction component and in the service hose. Compressed air or gas is applied to the flow conduits within the interaction component and the service hose to purge this remaining fluid to its final destination, namely to the serviced air conditioning system or alternately to a waste container. This is accomplished by setting a valve or switch on the control panel by the service person. Stated another way, the flow conduits of the system are purged by compressed gas.

It is noted that the function of the compressed air or gas source can be performed by other means. The air conditioning system being discussed also serves to illustrate this option. More specifically, the "high" pressure side of the air conditioning compressor can be used to drive the predetermined volume of oil from the injector into the air conditioning system. Details of this option will be disclosed in a subsequent section.

Upon completion of the third operational mode, the service system is ready to perform another service task. The next task, like the example of the previous service task, can employ the invention using an open loop flow pattern. Other service task that can be performed using this open loop flow pattern include flushing a piece of equipment where the flushing solvent is not recirculated, inflating a pneumatic tire with sealant and gas, filling an engine crank case with lubricating oil, filling a vehicle transmission with hydraulic oil, and the like.

The invention can be operated as a closed loop configuration, as will be illustrated with the following example, where the service task is to flush an air conditioning condenser with solvent, wherein the solvent is repeatedly circulated between the injector component and the condenser.

The first closed loop mode of operation consists of filling the injector with a specified amount of solvent, drawn from the reservoir component, using essentially the same valve settings as described previously in the open loop example. The injector sight glass is again used to determine when the correct amount of solvent has been drawn.

In the second mode of operation, the solvent is circulated from the injector, through the conduit system of the interaction component, through a service tube which connects to the inlet of the radiator, through the radiator, out through a second return service tube, through the interaction component, and back into the injector chamber. Circulation power is provided by the previously described refill pump which also operates as a circulation pump.

After circulating solvent for the desired time period, a the third mode of operation is initiated by setting the appropriate switches on the control panel. As in the previous example, the purpose of this third mode is to purge solvent from the service system, and the radiator being service, using the source of air or gas. This step is similar to the third mode of open loop operation in that the purged solvent is returned to the reservoir component for future use.

The use of the service system in the previously described closed loop mode of operation is by no means restricted to the example of flushing an air conditioning system condenser with solvent. It should be understood that the service system operating in this mode can be used to perform any type of service task which comprises the circulation of fluid within a closed loop.

As mentioned previously, the invention is ideally suited for "field" operation and for operation in facilities requiring numerous service carts. For installations requiring multiple service carts, certain required elements can be supplied to the individual service carts from central sources. As an example, if the invention is used in a service operation which involves the use of a vacuum, vacuum can be supplied by a central vacuum pump wherein vacuum is plumbed to individual service carts by means of hoses which tap off the central vacuum line. A vacuum is usually needed when the service cart is used to evacuate a serviced item, such as an air conditioning unit prior to filling with refrigerant and oil. As a second example, the previously described source of compressed gas or air can be supplied from a central compressor or cylinder, and plumbed to the individual service carts. When the invention is used to service air conditioning and refrigeration equipment, it is desirable to remove and to retain refrigerant and oil prior to servicing.

recover the refrigerant from the oil, and reuse the refrigerant and oil if possible. Refrigeration recovery units on each service cart are not practical from the operational and economic viewpoint in service or manufacturing facilities where multiple service operations are in progress simultaneously, because work stoppage or down time would result unless much duplicate equipment were purchased. It is desirable, therefore, to direct recovered refrigerant and oil from individual service carts, into a central flow conduit, and subsequently to a single, central refrigerant recovery system. Recovered refrigerant is likewise returned to individual service carts from the central recovery unit by means of a central refrigerant flow line and plumbing to individual service carts.

There are applications of the invention which require remote and relatively self contained operation. As mentioned previously, it is sometimes preferred that the reservoir component not be a central reservoir which is plumbed to one or more service carts, but rather a reservoir which is actually mounted on the individual service cart. Such a reservoir might be a cylinder of virgin refrigerant.

There are other embodiments and applications of the invention which will be discussed in the detailed description of the invention.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

FIG. 1 shows the service system operating in an open loop mode while

DETAILED DESCRIPTION OF THE PREFERRED EMBODIMENTS

The apparatus and methods of the invention will be disclosed in detail by first describing the apparatus, and thereafter describing the methods of operation of the apparatus in various operational modes to perform various service tasks. Adaptations of basic apparatus and methods will then be disclosed thereby indicating the versatility of the invention.

APPARATUS

Figure 1:
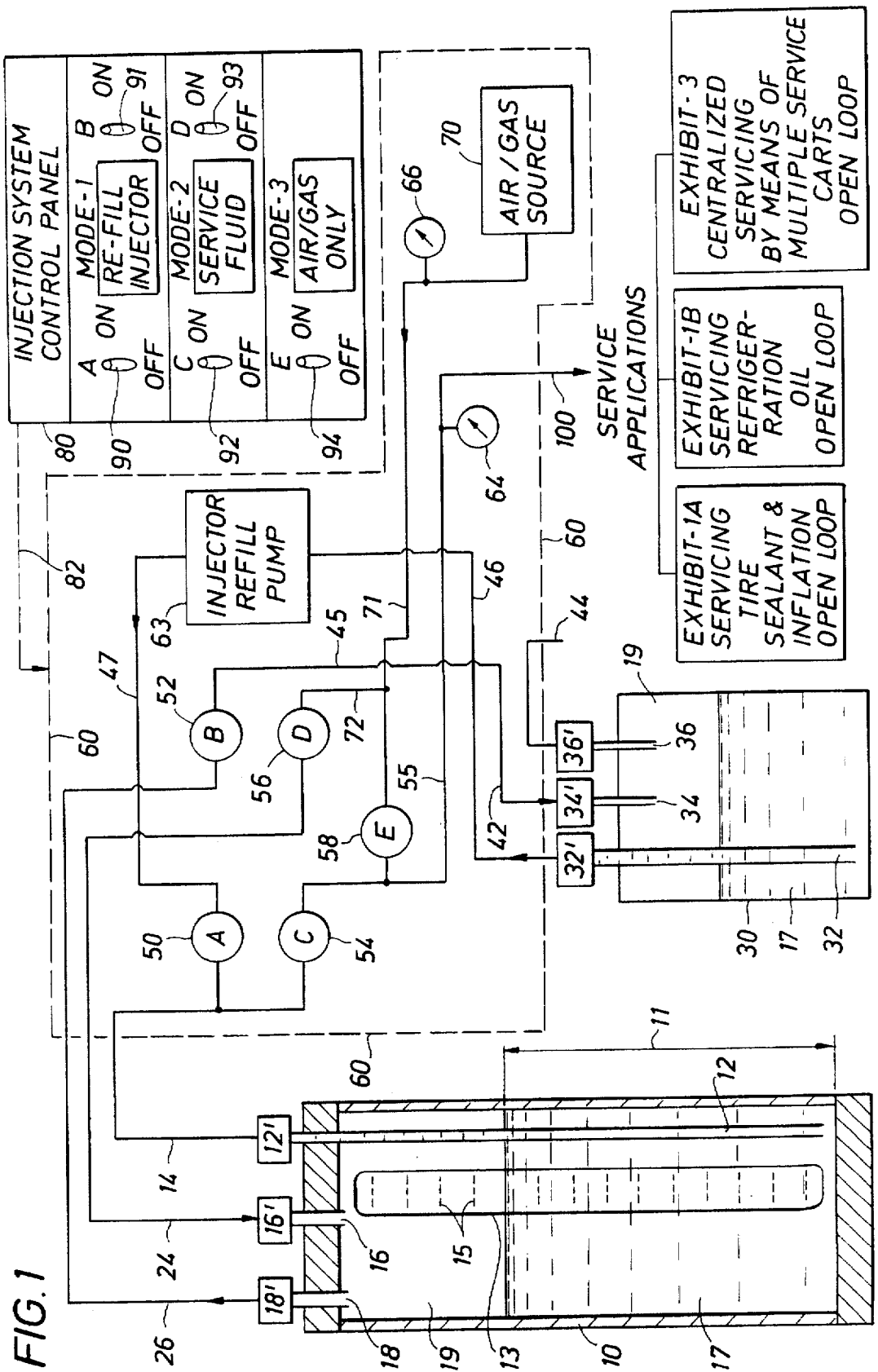

The service injection apparatus consists of three basic or "base" components which can be configured and operated to provide the versatility described above in the stated invention objects. Referring to FIG. 1, the three base components are defined as the calibrated injector chamber component 10, the reservoir component 30, and the interaction component whose elements are defined by the broken-line box and identified as a whole by the numeral 60.

Still referring to FIG. 1, the calibrated injector chamber component 10, or "injector chamber" for brevity, will be disclosed in more detail. The shape of the chamber 10 is preferably cylindrical, although other shapes can be used without significantly affecting the basic function of this component. The chamber 10 can be made from a wide variety of materials, including transparent materials so that the material within the chamber can be viewed by a service person operating the apparatus. The chamber 10 is depicted in FIG. 1 as being fabricated with a transparent "sight glass" 13 which is inscribed with calibration marks 15 indicating the volume of liquid 17 within the chamber. The chamber 10 contains two openings or "ports" 18, 16 and a flow conduit 12, which is preferably a tube, and which extends from the top of the chamber 10 to a near the bottom of the chamber. The functions of these elements will be described subsequently as pertaining to a calibrated amount of fluid which is to be injected into a system being serviced.

Again referring to FIG. 1, the reservoir component 30 is, as its name implies, a reservoir of fluid 17 to be injected into equipment being serviced using the service injection apparatus. The reservoir 30 can be remote from the injector chamber component 10, and can further serve as a reservoir for multiple injector components as will be discussed in detail in a subsequent section of this disclosure. The reservoir can be of any convenient shape, contains three "ports" or "openings" designated by the numerals 32, 34 and 36. The port 32 comprises a tube which extends to a location near the bottom of the reservoir 30. The port 34 is a gas intake, exhaust and, if necessary, a liquid overflow vent for the injection chamber 10, so that it effectively acts as a return line from the injector 10 back to the reservoir 30. The port 36 is an atmospheric vent to relieve any pressure within the reservoir 30 and thereby prevent substantial gas pressure buildup inside the reservoir. Functions of these ports will be further explained when the operation of the service apparatus is detailed.

The third base component, defined for brevity as the interaction component, comprises components used to perform the service task at hand and also serve as an "interaction" means between the injector component 10, the reservoir component 30, and the equipment being serviced (not shown). More specifically, the interaction component comprises a plurality of elements including valves, flow conduits or "tubes", pumps, compressors, and cylinders of gas. The interaction component is defined in FIG. 1 by the broken-line box and identified as a whole by the numeral 60. All elements of the interaction component are not shown in FIG. 1 for reasons of brevity. Only those elements needed to operate the service system in the "open loop" when employing the "open loop" flow pattern are shown in FIG. 1. Other elements will be shown in subsequent drawings depicting the service apparatus configured to operate in other modes, and to perform other service tasks. The various elements within the interaction component are controlled by means of valves or switch-operated valves on a control panel 80 which are set by the service person. The control panel is shown as being operationally and functionally connected to the interaction by means of the broken line 82.

The injector 10 and interaction component 60 are preferably contained within a service cart 200 (See FIG. 3) which is preferably on wheels 230 such that it can be positioned conveniently near the equipment being serviced. The reservoir component 30 can be remote from the service cart 200, or in some embodiments of the invention, can also be mounted on the service cart (See FIG. 3). Functional relationship between the interaction component 60, and the reservoir component 30, will be fully disclosed in the following section detailing the operation of the invention.

It was also noted early in this disclosure that the invention can be operated as a "closed loop" system or as an "open loop" system. The mode of operation is determined by the service task at hand, and the arrangement and settings of the elements of the interaction component 60. FIG. 1 illustrates the elements of the interaction component 60 required to operate the apparatus in the open loop mode. All other elements within the interaction component are not used in the open loop mode. These elements will be defined under the discussion of operating the invention in the closed loop flow pattern. The distinguishing features of the close loop and open loop operation will be summarized by examples.

OPERATION USING AN OPEN LOOP FLOW PATTERN

As an illustration of the operation of the service system as an open loop system, attention is again directed to FIG. 1 which shows the system in an open loop configuration. Assume for purposes of discussion that the service task requires the injection of a precise amount of oil into an air conditioning system. For this task, all required active elements within the interaction component are shown. Valves A, B, C, D and E are identified by the numerals 50, 52, 54, 56 and 58, respectively. A series of flow conduits are shown and identified, and these flow conduits will be referred to simply as "tubes" for brevity. It should be understood that these flow paths could comprise pipes, hoses, channels or the like. Initially, all valves are closed. There are three sequences or "modes of operation" required to perform the stated service task. Each of these operational modes will be described in the following paragraphs.

The first mode of operation is the filling of the injector 10 with liquid 17, which is oil in this example, to a level 11 as illustrated in FIG. 1. The liquid 17 is drawn from the reservoir 30 by opening valves 50 and 52. An injector refill pump 63 draws liquid 17 up through the tube 32 in the reservoir 30, through a tube 46 which is connected to the tube 32 by a fitting 32', through a tube 47 through the open valve 50, into the tube 14, and then into the tube 12, which is connected to a tube 14 by means of a fitting 12', thereby deposits this liquid into the chamber 10. As liquid 17 flows into the chamber 10, gas 19 is displaced. This displaced gas flows out through the outlet port 18, through a tube 26 which is connected to the outlet 18 by means of a fitting 18', through the open valve 52, through a tube 45, and into the reservoir chamber 30 through fitting 34' and port 34. As the injector 10 is filled, gas 19 displaced from the closed injector is transferred to the reservoir 30. This prevents any fumes which might be contained in the gas from venting into the atmosphere. This first or "injector fill" mode is initiated by the service person by operating valves or switch operated valves on the control panel 80. For the embodiment being disclosed, it will be assumed that switches are used to operate the valves. More specifically, switch 90 is set "on" to open the valve 50, and switch 91 is set "on" to open the valve 52. These switches are left "on" until the desired amount of liquid 17 flows into the chamber 10 as indicated by the liquid level 11 as read with the sight glass 13 and calibration marks 15.

Once a measured amount of liquid, which is oil in this example, is drawn into the injector chamber 10, the second mode of operation is initiated to transfer this oil from the injector assembly to the equipment being serviced (not shown). The valves 50 and 52 are closed by means of the switches 90 and 91 as illustrated in FIG. 1. Valves 54 and 56 are then opened by setting switches 92 and 93 in the "on" positions, respectively. Compressed gas from a cylinder or compressor source 70 passes through a tube 71, through a tube 72 and open valve 56, through the tube 24 and into the injector chamber 10 through the port 16 and fitting 16'. Gas pressure is preferably monitored by the pressure gauge 66.

The gas entering the chamber 10 forces the measured amount of liquid up through the tube 12 and through fitting 12' and tube 14, through the open valve 54, through a tube 55 which connects with a service hose 100. This service hose connects with the apparatus being serviced which, in this example, is an air conditioning system which is receiving the measured amount of oil. It should be understood that it is not necessary to inject all liquid within the chamber 10 into the apparatus being serviced. As an alternate, only a metered portion of the total content can be injected by observing the change in liquid level 11 as indicated by the sight glass calibration marks 15. Again, this mode of operation is initiated and terminated by the service person operating switches on the control panel 80.

Even though the a reading of the sight glass 13 indicates that the desired amount of liquid 17 has been driven from the injector chamber 10, a portion of the oil still resides within the conduits in the interaction component 60 and in the service hose 100. The conduit 55 and service hose 100 typically contain most of this residual liquid, since the valves and other components are preferably within the service cart and the other tubes are relatively short. It is desirable, therefore, to purge residual liquid from the tube 55 and service hose 100. This is accomplished by setting the switches on the control panel 80 for the third operational mode as indicated in FIG. 1 More specifically, the switches 90, 91, 92 and 93 are "off", closing their respective valves, and switch 94 is set "on" thereby opening valve 58. Compressed air or gas then flows through tube 71, open valve 58, tube 55 and the service hose 100 thereby purging all residual liquid from these flow paths.

Figure 1A:
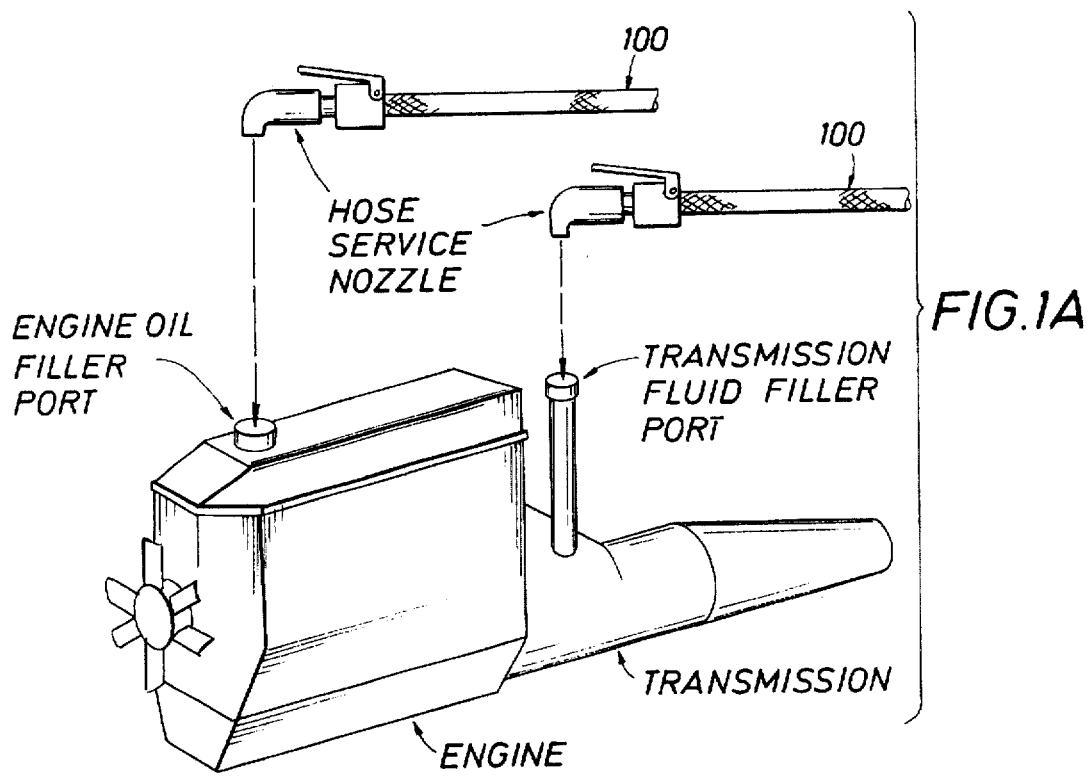
FIG. 1A and 1B show use of the system.
Figure 1B:
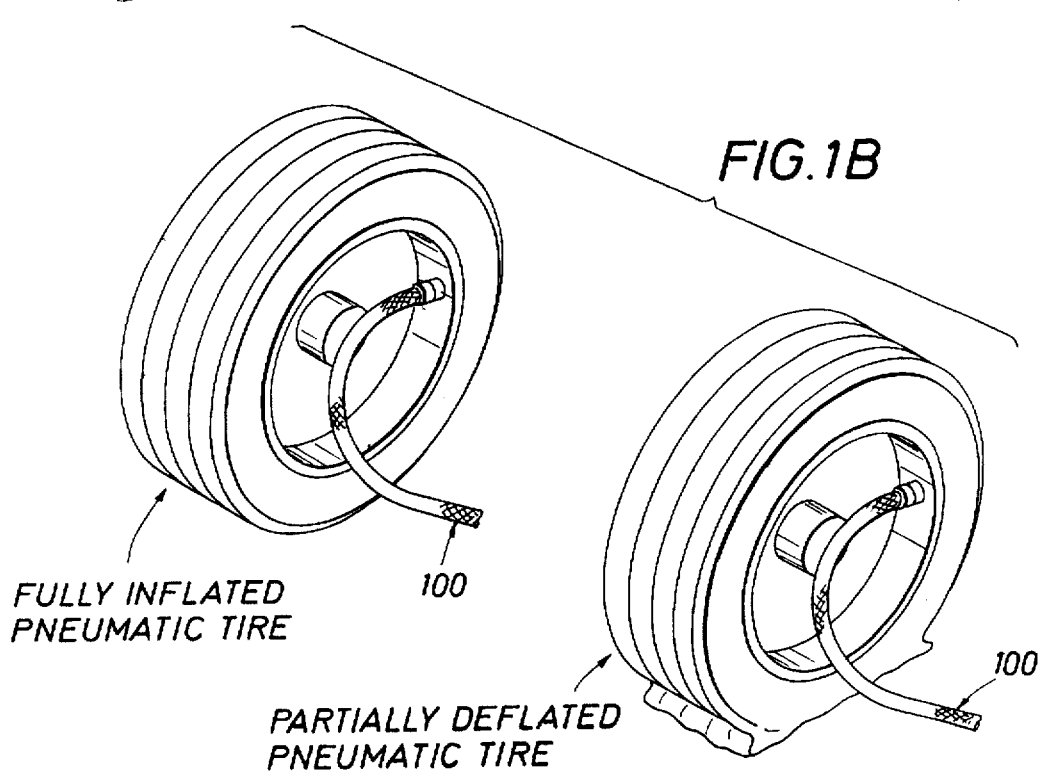

Upon completion of the third operational mode, the service system is ready to perform another service task. The next task, like the example of the previous service task, can employ the invention in the open loop flow pattern. Other service tasks that can be performed using this open loop flow pattern include flushing a piece of equipment where the flushing solvent is not recirculated, servicing a pneumatic tire with sealant (see FIG. 1B) and then inflating the tire with air or gas such as nitrogen, filling an engine crank case (FIG. 1A) with lubricating oil, filling a vehicle transmission with hydraulic oil, and the like as indicated in FIG. 1.

OPERATION USING A CLOSED LOOP FLOW PATTERN

The invention can be operated using a closed loop flow pattern as will be illustrated with the following example, where the service task is to flush an air conditioning condenser with a liquid solvent, wherein the solvent is to be repeatedly circulated between the injector component and the radiator.

Figure 2:
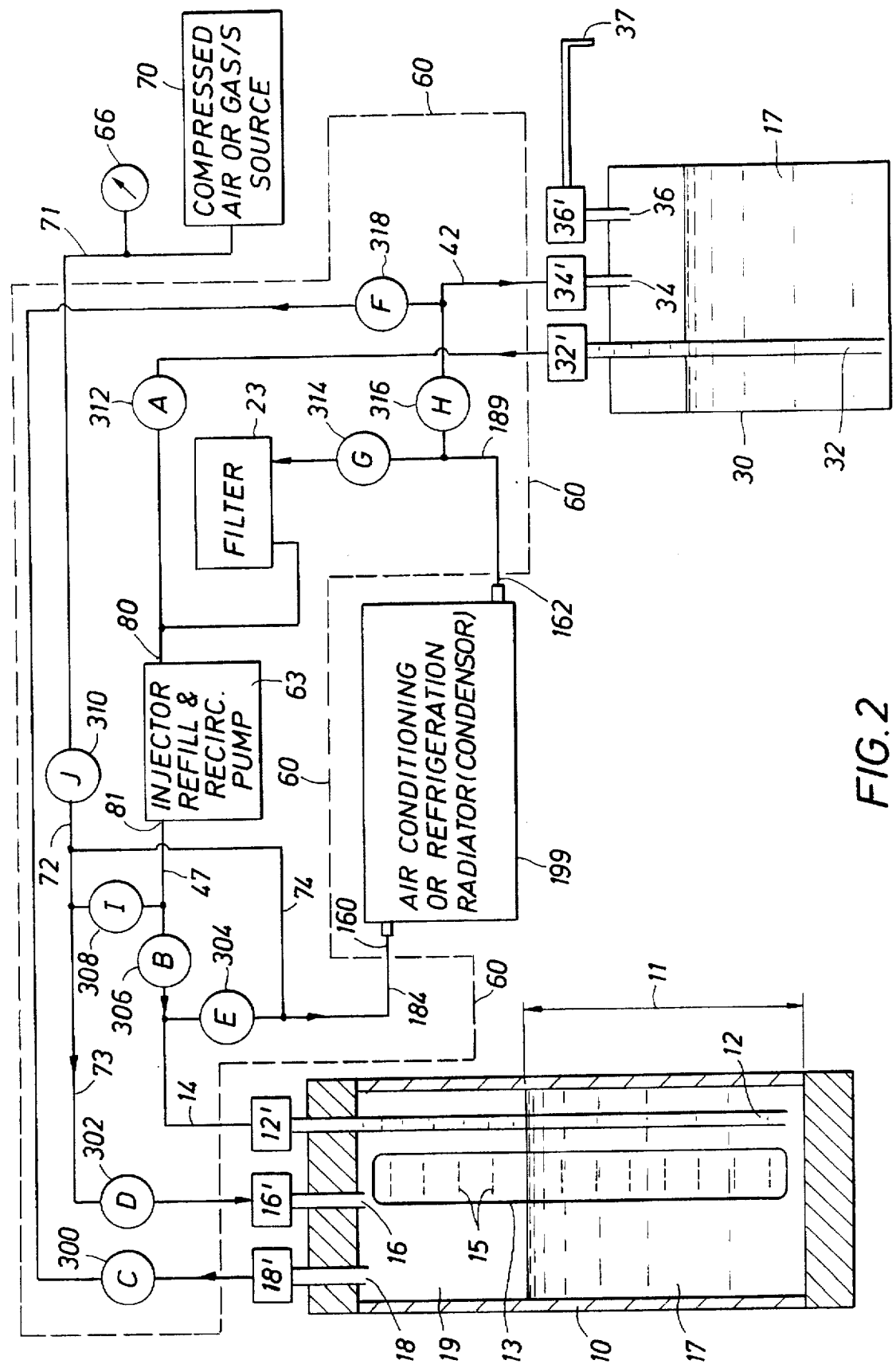
FIG. 2 shows the service system configured to operate in a closed loop mode.

Attention is now drawn to FIG. 2 which shows that there are a total of ten two-way valves, whereas the flow paths depicted in FIG. 1 required only five two-way valves. Furthermore, the control panel 80 shown in FIG. 1 has been omitted from FIG. 2 for reasons of simplification and clarity, but it should be understood that the following operational steps are initiated and terminated by a service person operating the appropriate valves or switches on the control panel. As in operations depicted by apparatus in FIG. 1, all control panel valves should be in the closed position before the initiation of any service. Furthermore, all switches should be closed immediately upon completion of that mode, before going to the next mode.

Still referring to FIG. 2, the first mode of operation consists of filling the injector chamber 10 with a specified amount of liquid solvent 17, drawn from the reservoir component 30, by opening the valves by opening valves 312, 306, 300, and 318, and operating the pump 63 as described previously in the open loop example. The injector sight glass 13 is again used to monitor the amount of solvent that is drawn into the injector chamber 10.

Again referring to FIG. 2, in the second mode of closed loop operation comprises continuously circulating the solvent fluid 17. Valves 304, 314, 308 and 302 are opened. The pump 62 now serves as a circulation pump to move liquid out of the injector chamber 10 through the tube 12, the port 12' and the tube 14, through open valve 304 through tube 184 to flush connector inlet 160 which is attached to the inlet of the condenser 199. After the solvent enters the condenser 199, it removes and carries contaminants outward through a flush connector outlet 162 by means of a tube 189, passing through an open valve 314, then through a filter/strainer 23 to remove contaminants before continuing to flow to the pump 62 through a pump inlet 80 After passing through a pump outlet 81, the filtered liquid is ready to be recirculated back to the injector 10 by first passing through an open valve 308, by means of a tube 73, to an open valve 302, through the fitting 16' and into the injector by means of the port 16

After circulating solvent 17 for the desired time period, a the third mode of operation is initiated by setting appropriate valves or switches on the control panel 80 (not shown in FIG. 2). As in the previous example, the purpose of this third mode is to purge solvent from the service system, and the apparatus being service, using the source 70 of air or gas. This step is similar to the third mode of open loop operation in that the purge solvent is returned to the reservoir component 30 for future use. More specifically, compressed air flows from the source 70, through a tube 71, through open valve 310, and then through tubes 72, 74 and 184 to the condenser inlet fitting 160. Residual liquid is thereby forced from the condenser 199 by the air pressure, out through the flush connector outlet 162, through the valve 316 and back into the reservoir 30 by means of the tube 42, the fitting 34' and the port 34.

The use of the service system in the previously described closed loop mode of operation is by no means restricted to the example of flushing an air conditioning radiator with solvent. It should be understood that the service system operating in this mode can be used to perform any type of service task which comprises the circulation of fluid within a closed loop system.

FIELD OPERATIONS

Figure 3:
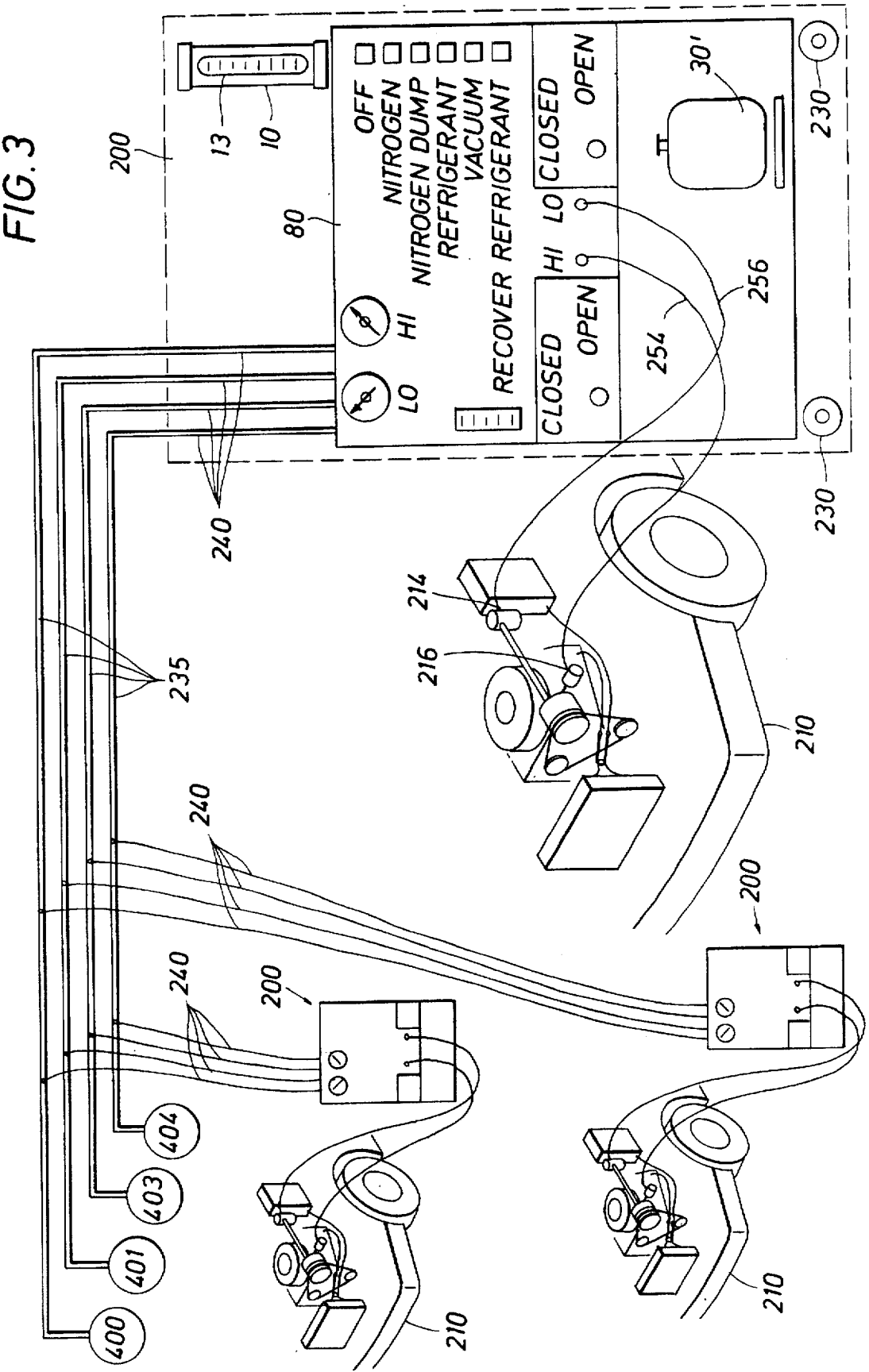
FIG. 3 shows multiple service carts being supplied with various materials and elements from remote, fixed reservoirs.

As mentioned previously, the invention is ideally suited for field operation and for operation in facilities requiring numerous service carts. For installations requiring multiple service carts, certain required elements can be supplied to the individual service carts from central sources. Such an installation is shown in FIG. 3 which depicts three service system workstations, mounted on service carts, and denoted by the numeral 200. Each service cart 200 has a set of wheels 230 for ease of movement to the vicinity of the apparatus being serviced.

In FIG. 3, the invention is shown servicing automobiles 210 and, in the enlarged view, the air conditioning unit of the automobile. Flow paths are established between the work station 200 and the air conditioning unit being serviced by flow conduits 254 and 256 which are preferably flexible hoses for convenience. The control panel 80 is shown with several representative functional switches, where some will be specifically discussed in following sections. The injector reservoir 10 and sight glass 13 are shown mounted on the top of the service cart for easy viewing by the service person.

Certain materials or "elements" are supplied to the plurality of service carts 200 from a remote, fixed sources. Four such generic remote sources or "reservoirs" are labeled 400, 401, 403 and 404 in FIG. 3. These elements are delivered to and from the service area as shown by flow arrows preferably by overhead plumbing conduits, such as pipes, identified as a group by the numeral 235. The various elements are supplied to the individual service carts by drops 240 which are tapped into the overhead plumbing pipes 235. As an example, if the cart 200 is used in a service operation which involves the use of a vacuum, the source 400 can comprise a central vacuum pump, and vacuum can be supplied by this central vacuum pump to the service carts by means of the appropriate overhead pipe 235 and corresponding drop lines 240. A vacuum is usually needed when the service cart is used to evacuate a serviced item, such as an air conditioning unit prior to filling with refrigerant and oil. As a second example, the previously described source of compressed gas or air can be supplied from a central compressor or cylinder, identified as the source 404 for purposes of discussion, and plumbed to the individual service carts by means of the corresponding pipe 235 and drops 240. When as a third example the invention is used to service air conditioning and refrigeration equipment, it is desirable to remove and to retain refrigerant and oil prior to servicing, recover the refrigerant from the oil, and reuse the refrigerant and oil if possible. Refrigeration recovery units on each service cart 200 are not practical from an operational and an economic viewpoint. It is desirable, therefore, to direct recovered refrigerant and oil from individual service carts 200, and to transfer this recovered fluid up an appropriate drop line to an overhead pipe 235, and subsequently to a single, central refrigerant recovery system which is defined as remote reservoir unit 403 for purposes of discussion. Such a recovery system comprises an oil-refrigerant separator chamber, an inlet for recovered refrigerant, an outlet for the separated refrigerant, and a drain for the "settled" oil. Recovered refrigerant can then be transferred to the remote reservoir 404 and then returned to the service carts 200 by means of the appropriate overhead pipe 235 and corresponding drops 240. Other materials, such as engine oil, brake fluid, sealant, coolant, specific purge gases such as nitrogen, automatic transmission fluid and the like can effectively be supplied to a plurality of service carts from a single, remote source, such as illustrated in FIG. 3.

There are applications of the invention which require remote and relatively self contained service carts 200. As mentioned previously, it is sometimes preferred that the materials or elements not be supplied from remote source reservoirs which is plumbed to one or more service carts, but rather from one or more reservoirs which are actually mounted on the individual service carts 200. Such a reservoir might be a cylinder 30' of virgin refrigerant as illustrated in FIG. 3. It should be understood that, in principle, each service cart can contain all elements previously discussed, but the system depicted in FIG. 3 is operationally and economically desirable as a delivery system for many elements as discussed in previous sections.

It is noted that the function of the compressed air or gas source can be performed by means other than the air/gas source 70 shown in FIGS. 1 and 2. As an example, if an air conditioning unit is being serviced, the unit itself can be used to perform the functions performed by the air/gas source 70 in previous examples. More specifically, the refrigeration oil can be forced by pressure from the injector reservoir 10 by the "high" pressure side of the air conditioning system while monitoring the amount by visually monitoring the injector chamber sight glass.

SUMMARY

The previous description of apparatus and methods of the invention serve to illustrate the versatility of the invention in performing many service tasks. There are other embodiments and applications of the invention which will be apparent to practitioners of the art.

The invention is essentially a manifold which can be configured for specific applications to "in-source" and "out-source" required elements through an open or closed loop flow pattern, the total embodiment of whose functions comprise the use of three base components which have been fully disclosed herein.

While the foregoing is directed to the preferred embodiments, the scope thereof is determined by the claims which follow.

What is claimed is:

1. A service apparatus for delivering a measured quantity of fluid, comprising:
   (a) a reservoir component for fluid to be delivered;
   (b) an injector component for temporarily holding a quantity of said fluid for later transfer; and
   (c) an interaction component cooperatively connected with said reservoir component and said injector component, wherein said interaction component comprises:
      (i) a pump for drawing said fluid from said reservoir component;
      (ii) means for transferring said drawn fluid to said injector component,
      (iii) a source of compressed gas for delivering said measured quantity of fluid from said injector component to an apparatus being serviced, and
      (iv) a control panel having controls on said control panel to control the flow, sequence and timing of drawing fluid, transferring fluid, and delivery of fluid to said apparatus being serviced, wherein
   (d) said service apparatus cooperates with said apparatus being serviced to connect thereto in a closed loop system and an open loop system and said controls are set to define a desired loop connection thereto.

2. The apparatus of claim 1 wherein said interaction component further comprises means for purging said interaction component and said injector component of said fluid.

3. The apparatus of claim 1 wherein said interaction component and said injector component are combined to form a unitized work station.

4. The apparatus of claim 3 further comprising a plurality of separate work stations each servicing an individual apparatus, and a plurality of plumbing conduits, wherein:
   (a) each said work station comprises a said interaction component;
   (b) said reservoir component is remote from said plurality of work stations;
   (c) each said interaction component further comprises a fluid return means for delivering fluid from said apparatus being serviced to said service apparatus; and
   (d) said fluid is supplied to or withdrawn from each said apparatuses being serviced by each said work station from said remote reservoir component through said plumbing conduits by said delivery means and said fluid return means.

5. The apparatus of claim 1 wherein said interaction component can be configured in alternate ways by said controls on said control panel, to provide an open flow path for said fluid to said apparatus being serviced.

6. The apparatus of claim 1 further comprising a return flow conduit connecting said apparatus being serviced with said service apparatus, wherein said interaction component can be configured, by said controls on said control panel, to provide a closed flow path for said fluid between said service apparatus and said apparatus being serviced by circulating, with the action of said pump, said fluid from said service apparatus through said means for delivering a measured quantity of fluid to said apparatus being serviced, and from said apparatus being serviced through said return conduit.

7. The apparatus of claim 1 wherein said interaction component is configured, by said controls on said control panel, to withdraw fluid from said apparatus being serviced by the action of said pump and through a return flow conduit connecting said apparatus being serviced with said service apparatus.

8. The apparatus of claim 7 further comprising a fluid recovery system which cooperates with said interaction component, wherein said recovery system processes any withdrawn fluid.

9. The apparatus of claim 8 wherein said interaction component is configured to deliver said processed fluid to said apparatus being serviced.

10. The apparatus of claim 1 further comprising a plurality of reservoir components, each providing a specific fluid, wherein each specific fluid can be transferred sequentially, by said interaction component to said injector component.

11. A service apparatus for delivering measured quantities of at least one type of fluid, comprising:
   (a) at least one reservoir component storing a specific fluid to be delivered;
   (b) an injector component for receiving transferred fluid and providing a measured quantity of said fluid for delivery; and
   (c) an interaction component which cooperates with said reservoir component and said injector component, wherein said interaction component comprises:
      (i) a pump for drawing said fluid from said at least one reservoir components,
      (ii) means for transferring said drawn fluid to said injector,
      (iii) gas driven means for delivering said measured quantity of fluid to an apparatus being serviced,
      (iv) means for delivering a fluid comprising at least one fluid drawn from at least one said reservoir component, and
      (v) a control panel having controls on said control panel to control the flow, sequence and timing of drawing fluid, transferring fluid, and delivery of fluid to said apparatus being serviced; wherein
   (d) said service apparatus cooperates with said apparatus being serviced to connect thereto in a closed loop system and an open loop system and said controls are set to define a desired loop connection thereto.

12. A service apparatus for delivering measured quantities of at least one type of fluid, comprising:
   (a) at least one reservoir component storing a specific fluid to be delivered,
   (b) an injector component for receiving transferred fluid and providing a measured quantity of said fluid for delivery;
   (c) an interaction component which cooperates with said reservoir component and said injector component, wherein said interaction component comprises:

(i) a pump for drawing said fluid from said at least one reservoir components, (ii) means for transferring said drawn fluid to said injector, (iii) means for delivering said measured quantity of fluid to an apparatus being serviced, (iv) means for delivering a fluid comprising at least one fluid drawn from at least one said reservoir component and (v) a control panel having controls on said control panel to control the flow, sequence and timing of drawing fluid transferring fluid, and delivery of fluid in a closed or an open system; wherein said interaction component further comprises (d) a plurality of valves;

(e) a source of compressed gas;

(f) said pump functioning as an injector refill pump; and (g) a plurality of flow conduits, wherein (i) the action of said pump powers drawing and transferring said fluid, (ii) said compressed gas from said source powers delivering said fluid;

(iii) said flow, sequence and timing is controlled by controls on said control panel, wherein said controls operate said plurality of valves, and (iv) said fluid flows within said interaction component through said conduits and said controlled valves.

13. The apparatus of claim 12 further comprising means for purging said interaction component and said injector component of a first fluid prior to drawing, transferring and delivering a second and different fluid.

14. The apparatus of claim 13 wherein said controls temporarily open an open flow path from said injection component and said apparatus being serviced.

15. The apparatus of claim 13 further comprising means for returning fluid from said apparatus being serviced to said service apparatus, wherein said controls temporarily provide a closed flow path comprising said delivery means and said returning fluid means between said reservoir component, said injection component, and said apparatus being serviced.

16. The apparatus of claim 12 wherein said injector comprises a calibrated sight glass for delivering a specified quantity of fluid to said apparatus being serviced.

17. The apparatus of claim 12 wherein said injector component and said interaction component are combined to form a unitized work station, and said fluid is transferred to said work station from a plurality of remote reservoir components, wherein each remote reservoir component contains a specific and different type of fluid.

18. The apparatus of claim 12 wherein:

(a) said service apparatus further comprises a plurality of injector components and a plurality of interaction components;

(b) a plurality of unitized work stations are formed, each comprising an injector component and a cooperating interaction component; and wherein (c) at least one reservoir component is remote from said work stations and stores a specific type of fluid to supply each of said work stations with at least one type of fluid.

19. The apparatus of claim 12 further comprising means for returning fluid from said apparatus being serviced to said service apparatus, wherein said interaction component is configured, by said controls on said control panel, to withdraw fluid from said apparatus being serviced.

20. The apparatus of claim 19 further comprising a recovery apparatus, wherein said recovery apparatus reprocesses said withdrawn fluid.

21. The apparatus of claim 19 wherein said interaction component is configured to deliver said withdrawn fluid to said apparatus being serviced.

22. A method for delivering a measured quantity of fluid, comprising the steps of:

(a) providing a reservoir of fluid to be delivered;

(b) transferring said fluid to an injector by a pump to enable a measured quantity of said fluid to be delivered; and (c) connecting an interaction component to said reservoir and to said injector, wherein said interaction component (i) draws said fluid from said reservoir with said pump;

(ii) transfers said drawn fluid to said injector;

(iii) delivers said measured quantity of fluid from said injector to an apparatus being serviced with compressed gas from a source of compressed gas; and (iv) controls the flow, sequence and timing of drawing fluid, transferring fluid, and delivery of fluid to said apparatus being serviced; wherein said service apparatus cooperates with said apparatus being serviced to connect thereto in a closed loop system and an open loop system and said controls define the desired loop connection.

23. The method of claim 22 wherein said interaction component is purged of said fluid after said measured quantity of fluid has been delivered.

24. The method of claim 23 wherein said interaction component is purged with compressed gas.

25. The method of claim 22 wherein said fluid is transferred to said interaction component and said injector from a remote reservoir.

26. The method of claim 25 wherein at least two types of fluid are sequentially delivered to a plurality of interaction components and cooperating injectors from a plurality of remote reservoirs, wherein each remote reservoir contains a specific type of fluid.

27. The method of claim wherein said interaction components and said cooperating injectors are purged of one type of fluid prior to the delivery of a different type of fluid.

28. The method of claim 22 further comprising the steps of configuring said means for drawing said fluid, transferring said drawn fluid, and delivering said measured quantity of fluid such that said fluid flows from said injector to said apparatus being served in an open flow path.

29. The method of claim 28 wherein said fluid comprises a refrigerant.

30. The method of 28 wherein said fluid comprises a compressed gas.

31. The method of claim 22 further comprising the steps of providing a return flow path means from said apparatus being serviced to said reservoir and said injector, and configuring said means for drawing said fluid, transferring said drawn fluid, and delivering said measured quantity of fluid such that said fluid flows in a closed flow path between said reservoir, said injector, and said apparatus being serviced.

32. The method of claim 31 wherein said fluid comprises a solvent.

33. The method of claim 22 wherein said fluid is a liquid.

34. The method of claim 22 comprising the additional step of providing a return flow path means from said apparatus being serviced to said reservoir and said injector, wherein sad interaction component is selectively and temporarily configured by controls on said control panel to withdraw fluid from said apparatus being serviced by said return flow means.

35. The method of claim 34 further comprising the step of processing said withdrawn fluid through a recovery apparatus.

36. The method of claim 35 wherein said interaction component is configured to deliver at least one component of said withdrawn and processed fluid to said apparatus being serviced.

37. The method of claim 36 wherein said withdrawn fluid comprises refrigerant and refrigerant oil.

38. A method of servicing an air conditioning system having a refrigerant flowing in the system where the system includes a pump needing lubrication wherein the method comprises the steps of:
   (a) connecting a service system to the air conditioning system including a supply line having a passage therein to deliver refrigerant therealong for the air conditioning system;
   (b) filling a sight glass to a specified volume of lubricant:
   (c) switching the sight glass to connect the supply line to the sight glass;
   (d) applying pressure to the sight glass to force a measured volume of lubricant out of the sight glass and into the supply line, wherein said lubricant commingles with said refrigerant in said supply line;
   (e) delivering a desired amount of refrigerant and commingled lubricant to the air conditioning system through said passage in said supply line; and
   (f) disconnecting the supply line from the air conditioning system thereby completing the servicing of the air-conditioning system.

39. The method of claim 38 including the preliminary step of purging the air conditioning system, and putting a measured amount of refrigerant in the air conditioning system after purging.

40. The method of claim 38 including the step of controlling flow of the lubricant to the air conditioning system by opening valves to deliver a pressure head to the sight glass so that pressure forces the lubricant from the sight glass and into the air conditioning system.

41. The method of claim 38 wherein the sight glass is located on a cart, and including the step of moving the cart to the air conditioning system and also including the step of providing gas under pressure to the sight glass from a remote source.

42. A system for servicing multiple automotive air conditioning systems comprising:
   (a) movable service carts;
   (b) a distribution gas flow system having at least a pair of connection sets for at least a pair of movable service carts;
   (c) a powered gas flow source centrally located for connection to said gas flow system to enable said service carts to operate;
   (d) a fluid source centrally located and fluidly connected to said distribution gas flow system;
   (e) wherein said service carts are movable to and from a position adjacent to an automobile air conditioning system and said gas flow source enables said service carts to provide a purge gas flow, and a refrigerant source provides a refrigerant capable of flowing in gas form, and said fluid source provides fluid which can be simultaneously flowed with said refrigerant;
   (f) a control panel on each said service cart for operating said cart to enable a desired flow for servicing automotive air conditioning system; and
   (g) valves in said cart for controlling the amount and relative proportions of said refrigerant and said fluid flow between said automotive air conditioning system and said cart, wherein said valves are controlled by said cart controls.

43. The system of claim 42 further including a centrally located vacuum pump connected to said gas flow system to furnish vacuum to said service carts so that said carts can remove refrigerant from said automotive air conditioning systems, and said vacuum is confined to a single line having a connection with at least two of said carts.

44. A system for servicing an automotive air conditioning system comprising:
   (a) first and second service carts having wheels;
   (b) a fixed, overhead gas distribution system;
   (c) flexible drop lines providing gas flow conduits between said carts and said gas distribution system;
   (d) remote gas pressure sources connected to said gas distribution system to provide at least two separate gases thereto through assigned gas lines, wherein said flexible drop lines allow said carts on said wheels to be moved with respect to said fixed, overhead gas distribution system, said two gases can flow within said gas distribution system simultaneously, and proportions of said gases, are controlled by controls on said carts; and
   (e) a pump mounted on each said service cart to aid in circulation and metering of said gases.

45. A service apparatus for delivering a measured quantity of fluid, comprising:
   (a) a reservoir component for fluid to be delivered;
   (b) an injector component for temporarily holding a quantity of said fluid for later transfer; and
   (c) an interaction component cooperatively connected with said reservoir component and said injector component, wherein said interaction component comprises:
      (i) a pump for drawing said fluid from said reservoir component;
      (ii) a transfer line for transferring said drawn fluid to said injector component,
      (iii) a metering device for delivering a measured quantity of fluid from said injector component to an apparatus being serviced, wherein said delivery is implemented by a compressed gas, and
      (iv) a control system to control the transferring and delivery of transferred fluid to the apparatus being serviced.

46. A service apparatus for delivering measured quantities of at least one type of fluid, comprising:
   (a) at least one reservoir component storing a specific fluid to be delivered;
   (b) an injector component for receiving transferred fluid and providing a measured quantity of said fluid for delivery; and
   (c) an interaction component which cooperates with said reservoir component and said injector component, wherein said interaction component comprises:
      (i) a pump for drawing said fluid from said at least one reservoir component,
      (ii) a transfer line for transferring said drawn fluid to said injector component,
      (iii) a source of compressed gas to convey fluid to an apparatus being serviced, (iv) a metering device cooperating with said source of compressed gas for delivering a measured quantity of fluid to said apparatus being serviced, and
(v) a control system having controls to control fluid transfer and deliver to the apparatus being serviced.

47. The service apparatus of claim 46 including plural reservoir components and each thereof has a different component therein.

* * * * *